United States Patent
Ebeid

(10) Patent No.: US 8,379,844 B2
(45) Date of Patent: *Feb. 19, 2013

(54) METHODS AND APPARATUS FOR PERFORMING AN ELLIPTIC CURVE SCALAR MULTIPLICATION OPERATION USING SPLITTING

(75) Inventor: Nevine Maurice Nassif Ebeid, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,710

(22) Filed: Jan. 20, 2012

(65) Prior Publication Data

US 2012/0114117 A1    May 10, 2012

Related U.S. Application Data

(63) Continuation of application No. 12/040,004, filed on Feb. 29, 2008, now Pat. No. 8,160,245.

(60) Provisional application No. 60/893,507, filed on Mar. 7, 2007.

(51) Int. Cl.
*H04K 1/00* (2006.01)

(52) U.S. Cl. .......... 380/30; 380/1; 380/28; 380/44; 380/277; 380/282

(58) Field of Classification Search .......... 380/1, 30, 380/28, 44, 277, 282; 713/167, 168; 708/620
See application file for complete search history.

(56) References Cited

U.S. PATENT DOCUMENTS

| | | | | |
|---|---|---|---|---|
| 5,442,707 | A | * | 8/1995 | Miyaji et al. .......... 380/30 |
| 5,497,423 | A | * | 3/1996 | Miyaji .......... 380/30 |
| 6,307,935 | B1 | * | 10/2001 | Crandall et al. .......... 380/28 |
| 6,666,381 | B1 | | 12/2003 | Kaminaga et al. |
| 6,876,745 | B1 | | 4/2005 | Kurumatani |
| 7,308,096 | B2 | | 12/2007 | Okeya et al. |
| 7,373,506 | B2 | | 5/2008 | Asano et al. |
| 7,505,587 | B2 | | 3/2009 | Izu et al. |
| 7,669,052 | B2 | | 2/2010 | Asano et al. |
| 7,676,037 | B2 | | 3/2010 | Jung et al. |
| 2001/0002486 | A1 | | 5/2001 | Kocher et al. |
| 2002/0029346 | A1 | | 3/2002 | Pezeshki et al. |
| 2002/0178371 | A1 | | 11/2002 | Kaminaga et al. |

(Continued)

FOREIGN PATENT DOCUMENTS

| CA | 2259089 A1 | 7/2000 |
|---|---|---|
| CA | 2424484 A1 | 10/2003 |

(Continued)

OTHER PUBLICATIONS

EPO, Extended European Search Report relating to application No. 08733548.5, dated Oct. 12, 2010.

(Continued)

*Primary Examiner* — Kambiz Zand
*Assistant Examiner* — Tongoc Tran
(74) *Attorney, Agent, or Firm* — Ridout & Maybee LLP

(57) ABSTRACT

For an Elliptic Curve Scalar Multiplication (ECSM) operation to be performed on a scalar and a base point, a given previous set of parameters that was used to split the scalar for a previous ECSM operation and a selected random integer are used to determine a new set of parameters for splitting the scalar. By basing the new set of parameters on the previous set of parameters, repeated use of the scalar to determine key-splitting parameters is avoided and susceptibility to a Differential Power Analysis Side Channel attack is minimized.

12 Claims, 5 Drawing Sheets

U.S. PATENT DOCUMENTS

| | | |
|---|---|---|
| 2008/0219450 A1 | 9/2008 | Ebeid |
| 2009/0074179 A1 | 3/2009 | Futa et al. |
| 2009/0262930 A1 | 10/2009 | Lambert |

FOREIGN PATENT DOCUMENTS

| | | |
|---|---|---|
| EP | 1548687 | 6/2005 |
| EP | 1729442 | 5/2006 |
| EP | 1816624 | 8/2007 |
| WO | 9935782 A1 | 7/1999 |
| WO | 0135573 | 5/2001 |

OTHER PUBLICATIONS

Ciet M et al: "(Virtually) Free Randomization Techniques Elliptic Curve Cryptography", Lecture Notes in Computer Science, Springer, DE, vol. 348-359, Oct. 10, 2003.

Bodo Moller, "Algorithms for Multi-eponentiation", Lecture Notes in Computer Science, Springer, DE vol. 2259, Jan. 1, 2001.

Okeya K. et al., "Use of Montgomery Trick in Precomputation of Multi-Scalar Multiplication in Elliptic Curve Cryptosystems", IEICE Transactions on Fundamentals of Eletronics, Communications and Computer Science, Engineering Sciences Society, Tokyo, JP, vol. E86-A, No. 1, Jan. 1, 2003.

Okeya K. et al., "Fast Multi-scalar Multiplication Methods on Elliptic Curves with Precomputation Strategy Using Montgomery Trick", Cryptographic hardware and embedded systems, internation workshop, Aug. 13, 2002.

Theriault N., "SPA resistant left-to-right integer recordings," Jan. 1, 2006, Selected Areas in Cryptography Lecture Notes in Computer Science; LNCS Springer, Berlin, pp. 345-358.

Izu et al., "Improved Elliptic Curve Multiplication Method Resistant against Side Channel Attacks," Progress in Cryptology-indocrypt. International Conference Incryptology in India, Dec. 16, 2002.

Ciet M. et al., "Preventing Differential analysis in GLV elliptic curve Scalar multiplication", Cryptographic Hardware and Embedded Systems, International workshop, Aug. 13, 2002.

Okeya et al., 'The Width-w NAF Method Provides Small Memory and Fast Elliptic Scalar Multiplications Secure against Side Channel Attacks, CT-RSA 2003, LNCS 2612, pp. 328-343.

* cited by examiner

METHODS AND APPARATUS FOR PERFORMING AN ELLIPTIC CURVE SCALAR MULTIPLICATION OPERATION USING SPLITTING

CROSS REFERENCE TO RELATED APPLICATIONS

The present application is a continuation of U.S. patent application Ser. No. 12/040,004, filed Feb. 29, 2008, now U.S. Pat. No. 8,160,245, and claim priority to U.S. Provisional Patent Application Ser. No. 60/893,507, filed Mar. 7, 2007, the contents of which are hereby incorporated herein by reference.

The present application is related to US Patent Application Publication No. 2008/0219438, which is being filed on even date herewith under attorney docket 42783-0502, entitled "Method And Apparatus For Generating A Public Key In A Manner That Counters Power Analysis Attacks," the contents of which are hereby incorporated herein by reference.

The present application is related to US Patent Application Publication No. 2008/0219437, which is being filed on even date herewith under attorney docket 42783-0512, entitled "Method and Apparatus for Performing Elliptic Curve Scalar Multiplication in a Manner that Counters Power Analysis Attacks," the contents of which are hereby incorporated herein by reference.

The present application is related to US Patent Application Publication No. 2008/0275932, which is being filed on even date herewith under attorney docket 42783-0504, entitled "Integer Division In A Manner That Counters A Power Analysis Attack," the contents of which are hereby incorporated herein by reference.

The present application is related to US Patent Application Publication No. 2008/0301458, which is being filed on even date herewith under attorney docket 42783-0510, entitled "DPA Countermeasure for the ECDSA," the contents of which are hereby incorporated herein by reference.

The present application is related to US Patent Application Publication No. 2008/0301459, which is being filed on even date herewith under attorney docket 42783-0514, entitled "Power Analysis Countermeasure for the ECMQV Key Agreement Algorithm," the contents of which are hereby incorporated herein by reference.

The present application is related to US Patent Application Publication No. 2008/0273694, which is being filed on even date herewith under attorney docket 42783-0506, entitled "Combining Interleaving with Fixed-Sequence Windowing in an Elliptic Curve Scalar Multiplication," the contents of which are hereby incorporated herein by reference.

FIELD OF THE INVENTION

The present application relates generally to cryptography and, more specifically, to performing an Elliptic Curve Scalar Multiplication operation using splitting.

BACKGROUND OF THE INVENTION

Cryptography is the study of mathematical techniques that provide the base of secure communication in the presence of malicious adversaries. The main goals of secure communication include confidentiality of data, integrity of data and authentication of entities involved in a transaction. Historically, "symmetric key" cryptography was used to attempt to meet the goals of secure communication. However, symmetric key cryptography requires entities to exchange secret keys through a secret channel prior to communication. One weakness of symmetric key cryptography is the security of the secret channel. Public key cryptography provides a means of securing a communication between two entities without requiring the two entities to exchange secret keys through a secret channel prior to the communication. An example entity "A" selects a pair of keys: a private key that is only known to entity A and is kept secret; and a public key that is known to the public. If an example entity "B" would like to send a secure message to entity A, then entity B needs to obtain an authentic copy of entity A's public key. Entity B encrypts a message intended for entity A by using entity A's public key. Accordingly, only entity A can decrypt the message from entity B.

For secure communication, it is essential that entity A select the pair of keys such that it is computationally infeasible to compute the private key given knowledge of the public key. This condition is achieved by the difficulty (technically known as "hardness") of known mathematical problems such as the known integer factorization mathematical problem, on which is based the known RSA algorithm, which was publicly described in 1977 by Ron Rivest, Adi Shamir and Leonard Adleman.

Elliptic curve cryptography is an approach to public key cryptography based on the algebraic structure of elliptic curves over finite mathematical fields. An elliptic curve over a finite field, K, may be defined by a Weierstrass equation of the form $$y^2 + a_1 xy + a_3 y = x^3 + a_2 x^2 + a_4 x + a_6. \quad (0.1)$$

If $K = F_p$, where p is greater than three and is a prime, equation (0.1) can be simplified to $$y^2 = x^3 + ax + b. \quad (0.2)$$

If $K = F_{2^m}$, i.e., the elliptic curve is defined over a binary field, equation (0.1) can be simplified to $$y^2 + xy = x^3 + ax^2 + b. \quad (0.3)$$

The set of points on such a curve (i.e., all solutions of the equation together with a point at infinity) can be shown to form an abelian group (with the point at infinity as the identity element). If the coordinates x and y are chosen from a large finite field, the solutions form a finite abelian group.

Elliptic curves cryptosystems rely on the hardness of a problem called the elliptic curve discrete logarithm problem (ECDLP). Where P is a point on an elliptic curve E and where the coordinates of P belong to a finite field, the scalar multiplication kP, where k is a secret integer, gives a point Q equivalent to adding the point P to itself k times. It is computationally infeasible, for large finite fields, to compute k knowing P and Q. The ECDLP is: find k given P and Q (=kP).

BRIEF DESCRIPTION OF THE DRAWINGS

Reference will now be made to the drawings, which show by way of example, embodiments of the invention, and in which.

DETAILED DESCRIPTION OF THE EMBODIMENTS

Figure 1:
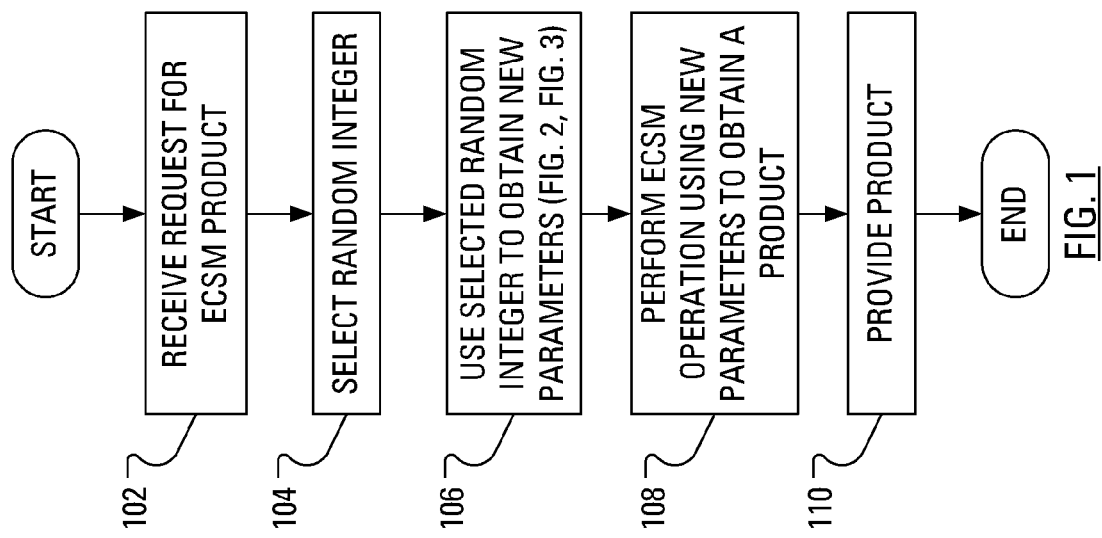
FIG. 1 illustrates example steps in an expanded Elliptic Curve Scalar Multiplication (ECSM) operation according to one embodiment, the example steps including a step of determining new key-splitting parameters from previous key splitting parameters.

In operation, a device implementing an Elliptic Curve Cryptosystem selects a value for a secret, or private, key, k, which may be a long term secret key or a short term secret key. Additionally, the device has access to a "base point", P. The device then generates Q=kP and publishes Q as a public key. Q may then be used for encryption or may then be used in a key agreement protocol such as the known Elliptic Curve Diffie-Hellman (ECDH) key agreement protocol.

In the known Elliptic Curve Menezes-Qu-Vanstone (ECMQV) key agreement protocol, Q=kP is not known as public key as in the ECDH key agreement protocol. In the ECMQV key agreement protocol and the known Elliptic Curve Digital Signature Algorithm (ECDSA), each entity has a (public key, private key) pair, say for entity A, this pair is $(d_A, Q_A)$. This is long term pair, hence $Q_A=d_A P$ is computed once per key life. Notably, in another step of the ECMQV key agreement protocol and the ECDSA, there is a random integer k (a nonce), selected by the signing entity in the ECDSA or both entities separately in the ECMQV, that is multiplied by the point P, i.e., kP is determined. Notably, since the nonce is only use once, the protection of k in the ECDSA or the ECMQV may be against SPA attacks, rather that the DPA attacks against which we propose to protect $d_A$.

The general point of an attack on a cryptosystem is to determine the value of the private key, k. Recently, especially given the mathematical difficulty of solving the ECDLP, cryptosystem attacks have been developed that are based on careful measurements of the physical implementation of a cryptosystem, rather than theoretical weaknesses in the algorithms. This type of attack is called a "side channel attack". In one known example side channel attack, a measurement of the exact amount of time taken by known hardware to encrypt plain text has been used to simplify the search for a likely private key. Other examples of side channel attacks involve measuring such physical quantities as power consumption, electromagnetic leaks and sound. Many side channel attacks require considerable technical knowledge of the internal operation of the system on which the cryptography is implemented. In particular, a power analysis attack involves obtaining information useful to the determination of a private key either by observing properties of electricity in the power lines supplying hardware implementing the cryptosystem or by detecting electromagnetic emanations from the power lines or said hardware.

In a Simple Power Analysis (SPA) attack, an attacker monitors the power consumption of a device to visually identify large features of the generation of the public key Q through the scalar multiplication operation, kP. Indeed, monitoring of the power consumption during a scalar multiplication operation may enable an attacker to recognize exact instructions as the instructions are executed. For example, consider that the difference between the power consumption for the execution of a point doubling (D) operation and power consumption for the execution of a point addition (A) operation is obvious. Then, by investigating one power trace of a complete execution of a double-and-add algorithm employed to perform a scalar multiplication, the bits of the scalar private key k may be revealed. In particular, whenever a D operation is followed by an A operation, the corresponding bit $k_i=1$, otherwise if a D operation is followed by another D operation, then $k_i=0$. A sequence of doubling and addition point operations is referred to as a DA sequence.

In a Differential Power Analysis (DPA) side-channel attack, an attacker exploits the varying power consumed by a microprocessor while the microprocessor executes cryptographic program code. Using statistical analysis of the power consumption measurements of many runs of a given cryptographic algorithm, the attacker may infer information about a secret key used in the given cryptographic algorithm. A DPA attack on a scalar multiplication algorithm may be based on collecting hundreds of power consumption measurements obtained during the execution of the scalar multiplication with the same private key. Even if the execution is SPA-resistant, a statistical analysis on the measurements collected can still reveal the private key.

It would be desirable to obtain the result of an Elliptic Curve Scalar Multiplication operation using a split private key while resisting revealing the private key to an attacker that employs the DPA attack.

In accordance with an aspect of the present application there is provided a method of publishing an Elliptic Curve Scalar Multiplication (ECSM) product of a scalar and a base point on an elliptic curve in a manner that counters power analysis attacks, the base point having a prime order. The method includes receiving the base point, the scalar and a previous set of parameters used to split the scalar for a previous ECSM, selecting a random integer, determining a new set of parameters for splitting the scalar, the determining based on the previous set of parameters and the random integer, obtaining the ECSM product using the new set of parameters to split the scalar and publishing the ECSM product. In other aspects of the present application, a mobile communication device is provided for carrying out this method and a computer readable medium is provided for adapting a processor to carry out this method.

In accordance with another aspect of the present application there is provided a method for countering power analysis attacks on an operation to determine an elliptic curve scalar multiplication product of a scalar and a base point on an elliptic curve, the base point having a prime order. The method includes receiving the base point, the scalar and a previous set of parameters used to split the scalar for an operation to determine a previous elliptic curve scalar multiplication product, selecting a random integer, determining a new set of parameters for splitting the scalar, the determining based on the previous set of parameters and the random integer and obtaining the elliptic curve scalar multiplication product using the new set of parameters to split the scalar.

Other aspects and features of the present invention will become apparent to those of ordinary skill in the art upon review of the following description of specific embodiments of the invention in conjunction with the accompanying figures.

It has previously been suggested that, to avoid revealing the scalar to an attack on an Elliptic Curve Scalar Multiplication (ECSM) operation, i.e., Q=kP, the scalar, k, may be split into two or more parts. Example steps in an expanded ECSM operation are presented in FIG. 1, as part of a larger Elliptic Curve cryptosystem application. The ECSM is called "expanded" due to the extra steps involved in splitting the scalar. A processor executing instructions describing the expanded ECSM operation receives (step 102) a request for an ECSM product, e.g., a request for Q=kP. The processor selects (step 104) a random integer, r, and uses the random integer and a previous set of key-splitting parameters to determine (step 106) a new set of key-splitting parameters. Examples of key splitting algorithms are presented in FIGS. 2, 3 and 4 and described hereinafter. The processor then uses the new set of key-splitting parameters, in conjunction with the random integer and the base point, P, to perform (step 108) an ECSM operation. Upon completion of the ECSM operation, the processor provides (step 110) the product of the ECSM operation to the requesting application. In one instance, the product of the ECSM operation may be published as a public key in an Elliptic Curve cryptosystem.

In a first example of key splitting, called "Additive Splitting Using Subtraction", an n-bit scalar is split through the use of an n-bit random integer, r. The scalar, k, is written as $k=k_1+k_2$, such that $k_1=k-r$ and $k_2=r$. kP may then be determined from $$kP = k_1P + k_2P \qquad (0.4)$$

In a second example of key splitting, called "Additive Splitting Using Division", the scalar is split by dividing the scalar by a random integer to obtain an integer quotient, multiplying the base point by the random integer to obtain an interim point, multiplying the interim point by the integer quotient and adding a product of the remainder of the division and the base point. That is, $$kP = \left\lfloor \frac{k}{r} \right\rfloor rP + (k \bmod r)P. \qquad (0.5)$$

Equation (0.5) can be rewritten as $$kP = gS + hP \qquad (0.6)$$

where g is the integer quotient, h is the remainder and S=rP is the interim point.

The bit length, l, of the random integer r may be chosen to be $$l = \left\lceil \frac{n}{2} \right\rceil.$$

That is, r is chosen uniformly at random from the range $[2^{l-1}, 2^l-1]$. Hence, the bit length of g is at most $$\left\lfloor \frac{n}{2} \right\rfloor + 1 \le l + 1$$

and the bit length of g is at least l and the bit length of h is at most l.

The processor begins a determination of kP by first performing an ECSM to determine the interim point S, where the scalar, r, is of a size half the size of k.

In a third example of key splitting, called "Multiplicative Splitting", the scalar is split to require two scalar multiplications. In particular, r is a random integer invertible modulo u, where u is the order of P. The scalar multiplication kP may then be evaluated as $$kP = \left[ \frac{k}{r} \bmod u \right] [rP]. \qquad (0.7)$$

For additional security, it has previously been proposed to change the random integer, r, frequently. However, despite not using the scalar directly in performing ECSM operations with a split scalar, each time a new random integer is selected, key-splitting parameters used in each ECSM operation must be determined anew. For a first example, in the Additive Splitting Using Subtraction example, the processor determines the key-splitting parameter $k_1=k-r$ for each new r. For a second example, in the Additive Splitting Using Division example, the processor determines the key-splitting parameter $$g = \frac{k}{r}$$

for each new r. For a third example, in the Multiplicative Splitting example, the processor determines the key-splitting parameter $$\frac{k}{r}$$

for each new r. Such determining of the key-splitting parameter for each change in the random integer, when subject to a Differential Power Analysis attack, may narrow the search space of k for an attacker.

In overview, to mitigate against a Differential Power Analysis attack, it is proposed herein to determine parameters for use in key splitting algorithms using previously determined key-splitting parameters. Accordingly, when the scalar is not used repetitively, e.g., in operations for determining parameters that define a split scalar before determining the product of an ECSM operation, the likelihood of a Differential Power Analysis providing an attacker an indication of the scalar is reduced significantly.

Figure 2:
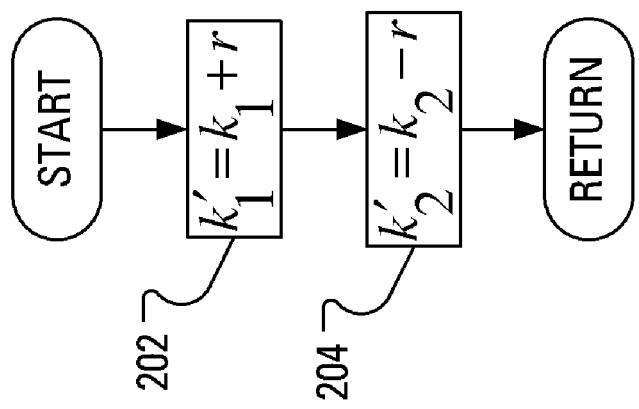
FIG. 2 illustrates steps in an example method for the step, in FIG. 1, of determining new key-splitting parameters for an Additive Splitting Using Subtraction scheme.

In operation, where the algorithm used to split the scalar is the Additive Splitting Using Subtraction algorithm, it may be assumed that the processor executing the steps of the Additive Splitting Using Subtraction, as illustrated in FIG. 2, is provided with key-splitting parameters, a previous augend, $k_1$, and a previous addend, $k_2$, from the previous execution of the splitting operation. It may also be assumed that the processor is provided with the random integer selected in step 104.

A successive augend $k_1$, that is, a new augend to succeed the previous augend may be denoted $k_1'$ and determined (step 202) as $k_1'=k_1+r$. A successive addend $k_2$, that is, a new addend to succeed the previous addend may be denoted $k_2'$ and determined (step 204) as $k_2'=k_2-r$. The processor may then return the new key-splitting parameters, $k_1'$ and $k_2'$, thereby allowing the processor to perform (step 108) the requested ECSM operation using the split scalar, in conjunction with the base point, P. Advantageously, the new parameters, $k_1'$ and $k_2'$, have been determined without re-use of the scalar, k, thereby providing a countermeasure to a DPA attack.

In alternative operation, where the splitting of the scalar is to use the Additive Splitting Using Division algorithm, the key-splitting parameters provided to the processor include a previously determined integer quotient, $g_1$, a previously determined remainder, $h_1$, the random integer, $r_1$, used in the previous determination and the random integer, $r_2$, selected in step 104. It is proposed herein to determine a successive integer quotient, $g_2$, and a successive remainder, $h_2$, without the re-use of the scalar, k, thereby providing a countermeasure to a DPA attack. Given an original split scalar, the random integer used to split the scalar and a random integer for generating a successive split scalar, $r_1$, $$g_1 = \left\lfloor \frac{k}{r_1} \right\rfloor,$$

$h_1 = k \bmod r_1$ and $r_2$, we want to find the new key-splitting parameters including a successive quotient, $$g_2 = \left\lfloor \frac{k}{r_2} \right\rfloor,$$

and a successive remainder, $h_2 = k \bmod r_2$, without employing any operations that use k.

Figure 3:
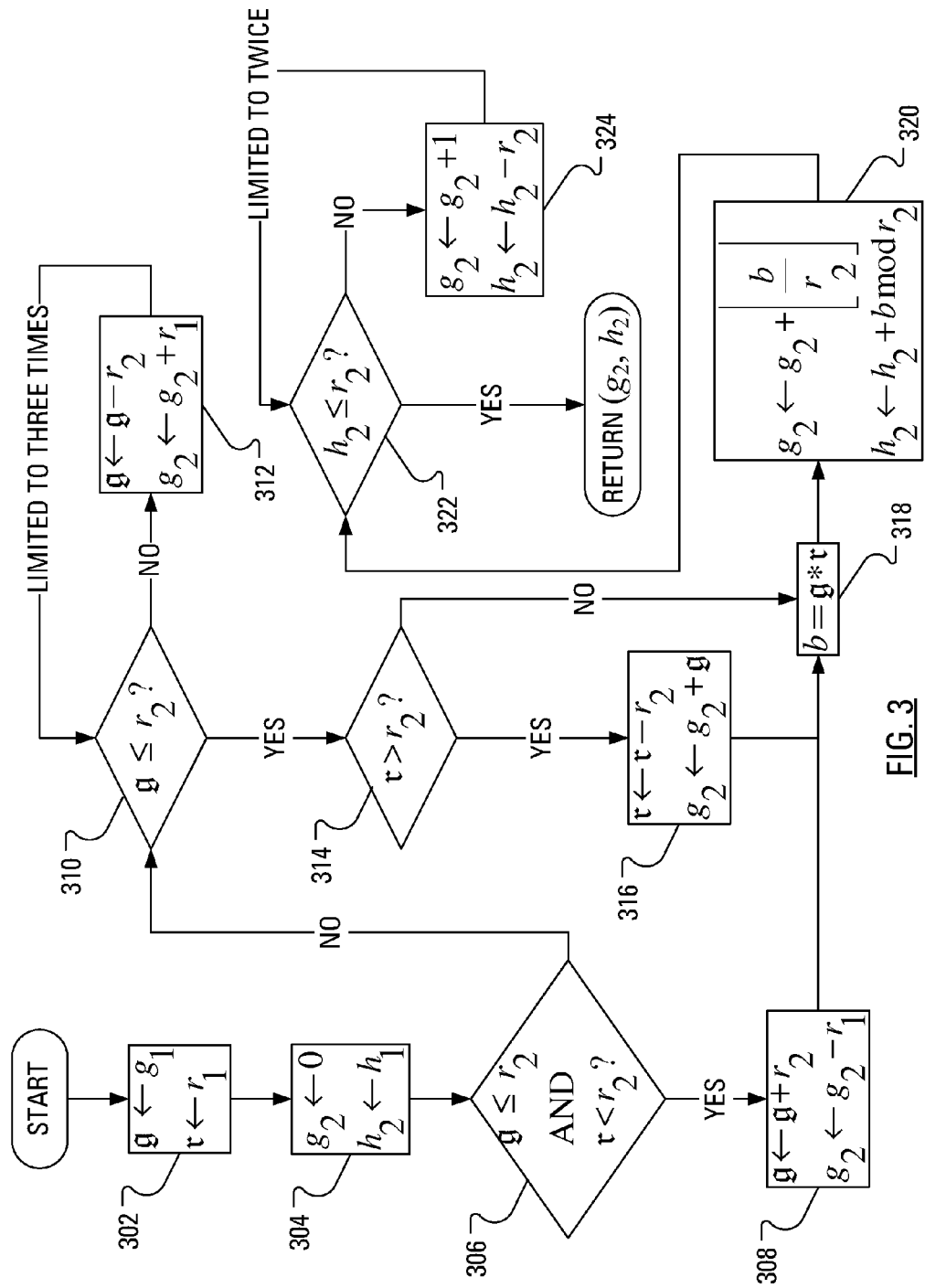
FIG. 3 illustrates steps in an example method for the step, in FIG. 1, of determining new key-splitting parameters for an Additive Splitting Using Division scheme.

We introduce a temporary quotient, g, and a temporary random integer, r, for use in a method whose example steps are presented in FIG. 3. To begin, a processor initializes (step 302) the temporary quotient, g, and the temporary random integer, r, with the values of the original quotient and the original random integer, respectively, i.e., $g \leftarrow g_1$ and $r \leftarrow r_1$. Additionally, the processor initializes (step 304) the successive quotient and the successive remainder. In particular, the successive quotient is assigned the value zero and the successive remainder is assigned the value of the original remainder, i.e., $g_2 \leftarrow 0$ and $h_2 \leftarrow h_1$.

The processor then compares (step 306) the temporary quotient to the successive random integer and compares the temporary random integer to the successive random integer. Only if the temporary quotient is less than, or equal to, the successive random integer and the temporary random integer is less than the successive random integer, the processor determines (step 308) a sum of the temporary quotient and the successive random integer assigns (step 308) the sum to the temporary quotient. Additionally, if the temporary quotient is less than, or equal to, the successive random integer and the temporary random integer is less than the successive random integer, the processor determines (step 308) the difference between the successive quotient and the original random integer and assigns (step 308) the difference to the successive quotient.

If the successive random integer is less than the temporary quotient or the temporary random integer is greater than, or equal to, the successive random integer, the processor compares (step 310) the temporary quotient to the successive random integer. If the temporary quotient is greater than the successive random integer, the processor reduces (step 312) the temporary quotient by the value of the successive random integer and the processor increases (step 312) the successive quotient by the value of the original random integer. The processor then, again, compares (step 310) the temporary quotient to the successive random integer. If the temporary quotient is greater than the successive random integer, the processor reduces (step 312) the temporary quotient by the value of the successive random integer and the processor increases (step 312) the successive quotient by the value of the original random integer. The loop represented by step 310 and step 312 is repeated at most three times.

The processor, upon determining (step 310) that the temporary quotient is less than, or equal to, the successive random integer, compares (step 314) the temporary random integer to the successive random integer. If the temporary random integer is greater than the successive random integer, the processor determines (step 316) the difference between the temporary random integer and the successive random integer and assigns (step 316) the difference to the temporary random integer. Additionally, if the temporary random integer is greater than the successive random integer, the processor determines (step 316) the sum of the successive quotient and the temporary quotient and assigns (step 316) the sum to the successive quotient.

Subsequent to reassigning (step 316) the temporary random integer and the successive quotient or subsequent to determining (step 314) that the successive random integer is greater than, or equal to, the temporary random integer or subsequent to reassigning (step 308) the temporary quotient and the successive quotient, the processor determines (step 318) a value for a temporary product, b, of the temporary quotient and the temporary random integer.

The processor then uses the temporary product to determine an integer quotient wherein the temporary product is the dividend and the successive random integer is the divisor. The processor determines (step 320) a sum of the successive quotient and the integer quotient and assigns (step 320) the sum to the successive quotient. The processor also uses the temporary product to determine an temporary remainder by determining $b \bmod r_2$. The processor then determines (step 320) a sum of the temporary remainder and the successive remainder and assigns (step 320) the sum to the successive remainder.

The processor then compares (step 322) the successive remainder to the successive random integer. Where the successive remainder is greater than the successive random integer, the processor increases (step 324) the value of the successive quotient by one. Also where the successive remainder is greater than the successive random integer, the processor determines (step 324) the difference between the successive remainder and the successive random integer and assigns (step 324) the difference to the successive remainder. The processor then compares (step 322) the successive remainder to the successive random integer. Where the successive remainder is greater than the successive random integer, the processor increases (step 324) the value of the successive quotient by one. Also where the successive remainder is greater than the successive random integer, the processor determines (step 324) the difference between the successive remainder and the successive random integer and assigns (step 324) the difference to the successive remainder. The loop represented by step 322 and step 324 is repeated at most twice.

Upon determining (step 322) that the successive remainder is less than, or equal to, the successive random integer, the processor considers the method complete and considers that the successive quotient, $g_2$, and the successive remainder, $h_2$, have been determined.

The processor may then return the new key-splitting parameters, i.e., the successive quotient, $g_2$, and the successive remainder, $h_2$, thereby allowing the processor to perform (step 108) the requested ECSM operation using the split scalar, in conjunction with the base point, P. Advantageously, the new key-splitting parameters, $g_2$ and $h_2$, have been determined without re-use of the scalar, k, thereby providing a countermeasure to a DPA attack.

Note that the SPA information leaked from the method whose example steps are presented in FIG. 3 is not critical. However, in the illustrated implementation, the paths have been balanced to minimize information leakage. In practice, each comparison is replaced with a corresponding subtraction and sign verification. Also, to take advantage of available storage, the twos complement and the double of some values may be determined in advance and stored for subsequent use in the method whose example steps are presented in FIG. 3. Accordingly, the method whose example steps are presented in FIG. 3 may be performed using only addition operations and sign check operations.

In alternative operation, where the splitting of the scalar is to use the Multiplicative Splitting, the key-splitting parameters provided to the processor include a $t^{th}$ random integer selected in step 104. The $t^{th}$ Multiplicative Splitting involves two scalar multiplications: first, the processor determines $R=r_t P$; then, the processor determines $$\frac{k}{r_t} R = k r_t^{-1} R.$$

It is desirable that the scalar k be not involved in the computation of $kr_t^{-1}$ (mod u) before every scalar multiplication execution. Accordingly, it is proposed herein to store a chain $r_t$ of multiplied random integers from the first up to the $t^{th}$ scalar multiplication; $r_t = r_t r_{t-1} \ldots r_1 \pmod{u}$. Additionally, it is proposed herein to store a key chain as $k_t = k r_1^{-1} \ldots r_{t-1}^{-1} r_t^{-1} \pmod{u}$.

Figure 4:
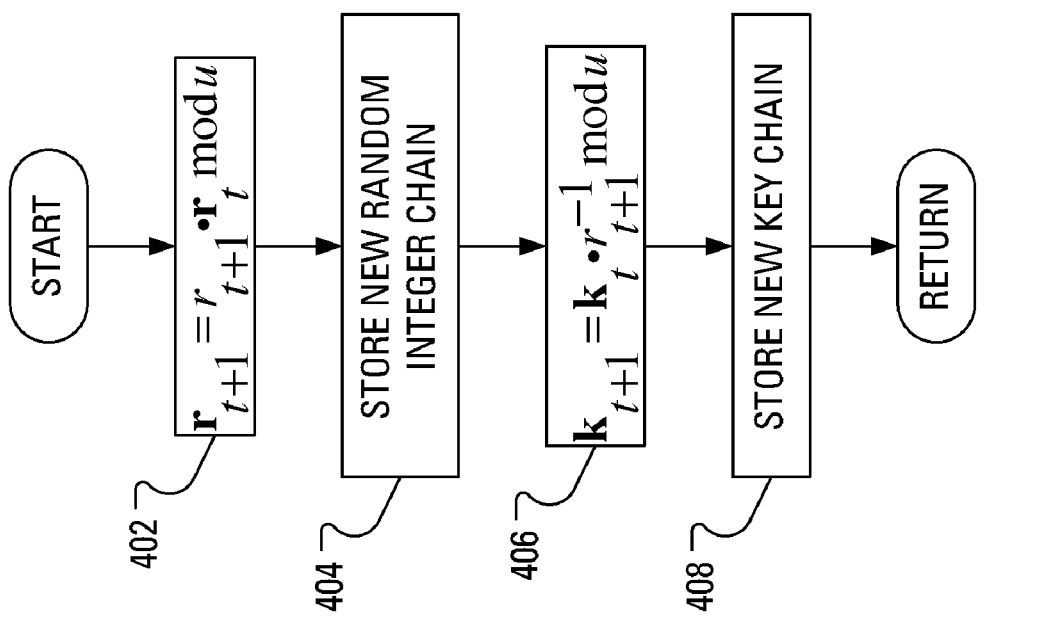
FIG. 4 illustrates steps in an example method for the step, in FIG. 1, of determining new key-splitting parameters for a Multiplicative Splitting scheme.

Upon receiving (step 102, FIG. 1) a request for an ECSM product, the processor selects (step 104) a new random integer, $r_{t+1}$. FIG. 4 illustrates example steps in a method of using a previous random integer chain $r_t$ and a previous key chain $k_t$ to determine (step 106) a new random integer chain and a new key chain $k_{t+1}$. In particular, the processor determines (step 402) a new integer chain as a product of the selected random integer and the previous random integer chain, $r_{t+1} = r_{t+1} r_t \pmod{u}$. The processor then stores (step 404) the new integer chain. Additionally, the processor determines (step 406) a new key chain as a product of the previous key chain and an inverse of the new random integer, $k_{t+1} = k_t r_{t+1}^{-1} \pmod{u}$. The processor then stores (step 408) the new key chain. The processor then performs (step 108) the ECSM operation by first finding $R_{t+1} = r_{t+1} P_{t+1}$ and then $kP_{t+1} = k_{t+1} R_{t+1}$. Notably, it can be shown that the length of $r_i$ will reach n bits after few iterations.

Figure 5:
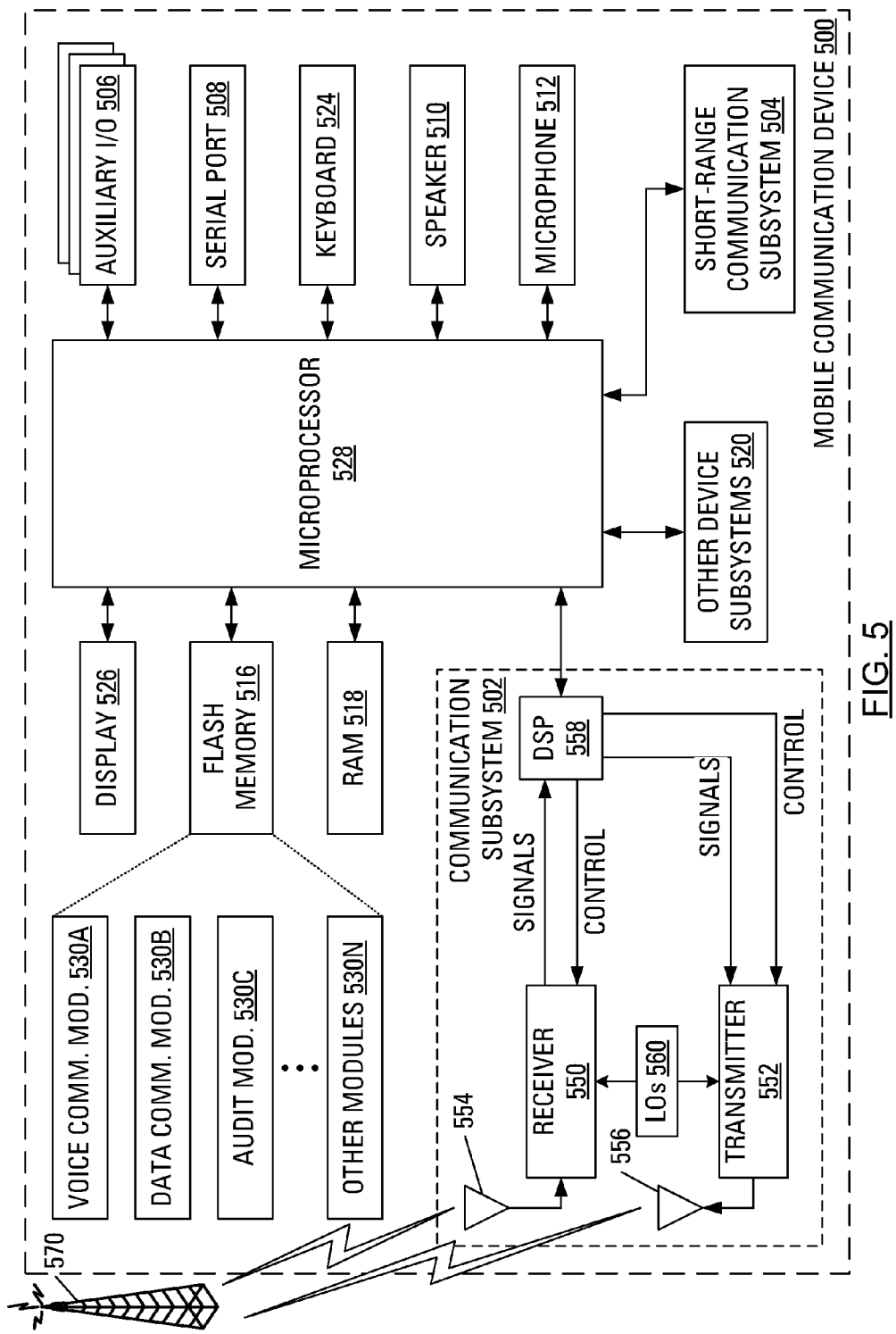
FIG. 5 illustrates an apparatus for carrying out the method of FIG. 1.

FIG. 5 illustrates a mobile communication device 500 as an example of a device that may carry out the method of FIG. 1. The mobile communication device 500 includes a housing, an input device (e.g., a keyboard 524 having a plurality of keys) and an output device (a display 526), which may be a full graphic, or full color, Liquid Crystal Display (LCD). Other types of output devices may alternatively be utilized. A processing device (a microprocessor 528) is shown schematically in FIG. 5 as coupled between the keyboard 524 and the display 526. The microprocessor 528 controls the operation of the display 526, as well as the overall operation of the mobile communication device 500, in part, responsive to actuation of the keys on the keyboard 524 by a user.

The housing may be elongated vertically, or may take on other sizes and shapes (including clamshell housing structures). Where the keyboard 524 includes keys that are associated with at least one alphabetic character and at least one numeric character, the keyboard 524 may include a mode selection key, or other hardware or software, for switching between alphabetic entry and numeric entry.

In addition to the microprocessor 528, other parts of the mobile communication device 500 are shown schematically in FIG. 5. These include: a communications subsystem 502; a short-range communications subsystem 504; the keyboard 524 and the display 526, along with other input/output devices including a set of auxiliary I/O devices 506, a serial port 508, a speaker 510 and a microphone 512; as well as memory devices including a flash memory 516 and a Random Access Memory (RAM) 518; and various other device subsystems 520. The mobile communication device 500 may be a two-way radio frequency (RF) communication device having voice and data communication capabilities. In addition, the mobile communication device 500 may have the capability to communicate with other computer systems via the Internet.

Operating system software executed by the microprocessor 528 may be stored in a computer readable medium, such as the flash memory 516, but may be stored in other types of memory devices, such as a read only memory (ROM) or similar storage element. In addition, system software, specific device applications, or parts thereof, may be temporarily loaded into a volatile store, such as the RAM 518. Communication signals received by the mobile device may also be stored to the RAM 518.

The microprocessor 528, in addition to its operating system functions, enables execution of software applications on the mobile communication device 500. A predetermined set of software applications that control basic device operations, such as a voice communications module 530A and a data communications module 530B, may be installed on the mobile communication device 500 during manufacture. A public key generation module 530C may also be installed on the mobile communication device 500 during manufacture, to implement aspects of the present application. As well, additional software modules, illustrated as an other software module 530N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 570 represented by a radio tower. The data items managed by the PIM application may be seamlessly integrated, synchronized and updated via the wireless carrier network 570 with the device user's corresponding data items stored or associated with a host computer system.

Communication functions, including data and voice communications, are performed through the communication subsystem 502 and, possibly, through the short-range communications subsystem 504. The communication subsystem 502 includes a receiver 550, a transmitter 552 and one or more antennas, illustrated as a receive antenna 554 and a transmit antenna 556. In addition, the communication subsystem 502 also includes a processing module, such as a digital signal processor (DSP) 558, and local oscillators (LOs) 560. The specific design and implementation of the communication subsystem 502 is dependent upon the communication network in which the mobile communication device 500 is intended to operate. For example, the communication subsystem 502 of the mobile communication device 500 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), etc. Other types of data and voice networks, both separate and integrated, may also be utilized with the mobile communication device 500.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 500 may send and receive communication signals over the wireless carrier network 570. Signals received from the wireless carrier network 570 by the receive antenna 554 are routed to the receiver 550, which provides for signal amplification, frequency down conversion, filtering, channel selection, etc., and may also provide analog to digital conversion. Analog-to-digital conversion of the received signal allows the DSP 558 to perform more complex communication functions, such as demodulation and decoding. In a similar manner, signals to be transmitted to the wireless carrier network 570 are processed (e.g., modulated and encoded) by the DSP 558 and are then provided to the transmitter 552 for digital to analog conversion, frequency up conversion, filtering, amplification and transmission to the wireless carrier network 570 (or networks) via the transmit antenna 556.

In addition to processing communication signals, the DSP 558 provides for control of the receiver 550 and the transmitter 552. For example, gains applied to communication signals in the receiver 550 and the transmitter 552 may be adaptively controlled through automatic gain control algorithms implemented in the DSP 558.

In a data communication mode, a received signal, such as a text message or web page download, is processed by the communication subsystem 502 and is input to the microprocessor 528. The received signal is then further processed by the microprocessor 528 for output to the display 526, or alternatively to some auxiliary I/O devices 506. A device user may also compose data items, such as e-mail messages, using the keyboard 524 and/or some other auxiliary I/O device 506, such as a touchpad, a rocker switch, a thumb-wheel, a trackball, a touchscreen, or some other type of input device. The composed data items may then be transmitted over the wireless carrier network 570 via the communication subsystem 502.

In a voice communication mode, overall operation of the device is substantially similar to the data communication mode, except that received signals are output to a speaker 510, and signals for transmission are generated by a microphone 512. Alternative voice or audio I/O subsystems, such as a voice message recording subsystem, may also be implemented on the mobile communication device 500. In addition, the display 526 may also be utilized in voice communication mode, for example, to display the identity of a calling party, the duration of a voice call, or other voice call related information.

The short-range communications subsystem 504 enables communication between the mobile communication device 500 and other proximate systems or devices, which need not necessarily be similar devices. For example, the short-range communications subsystem may include an infrared device and associated circuits and components, or a Bluetooth™ communication module to provide for communication with similarly-enabled systems and devices.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method, for being performed by a computer system, of obtaining an Elliptic Curve Scalar Multiplication (ECSM) product of a scalar and a base point on an elliptic curve in a manner that counters power analysis attacks, said base point having a prime order, said method comprising:
   receiving said base point, said scalar and a previous set of parameters used to split said scalar for a previous ECSM, said previous set of parameters including a previous quotient and a previous remainder determined using said scalar as a dividend and a first random integer as a divisor;
   selecting a second random integer;
   determining a new set of parameters for splitting said scalar, said determining based on said previous set of parameters and said second random integer, said new set of parameters including a successive quotient and a successive remainder, said determining said new set of parameters including:
      determining said successive quotient based on said previous quotient, said previous remainder and said second random integer; and
      determining said successive remainder based on said previous quotient, said previous remainder and said second random integer, said determining said successive remainder including:
         determining a temporary sum of said previous quotient and said second random integer;
         determining a temporary product of said temporary sum and said first random integer;
         determining a representation of said temporary product modulo said second random integer; and
         determining said successive remainder as a sum of said previous remainder and said representation; and
   obtaining said ECSM product using said new set of parameters to split said scalar.

2. The method of claim 1 wherein said scalar is a private cryptographic key.

3. The method of claim 1 further comprising publishing said ECSM product.

4. The method of claim 1 wherein said determining said successive quotient includes:
   determining a temporary quotient as a sum of said previous quotient and said second random integer;
   determining a temporary product of said temporary quotient and said first random integer;
   determining an integer part of a new quotient for which said temporary product is a dividend and said second random integer is a divisor; and
   determining said successive quotient as a difference between said integer part of said new quotient and said first random integer.

5. A mobile communication device for obtaining an Elliptic Curve Scalar Multiplication (ECSM) product of a scalar k and a base point P on an elliptic curve in a manner that counters power analysis attacks, said device comprising:
   a memory storing said scalar k, said base point P and a previous set of parameters used to split said scalar for a previous ECSM, said previous set of parameters including a previous quotient and a previous remainder determined using said scalar as a dividend and a first random integer as a divisor; and a processor configured to:
  select a second random integer;
  determine a new set of key-splitting parameters for splitting said scalar, said determining based on said previous set of parameters and said second random integer, said new set of parameters including a successive quotient and a successive remainder, by:
    determining said successive quotient based on said previous quotient, said previous remainder and said second random integer; and
    determining said successive remainder by:
      determining a temporary sum of said previous quotient and said second random integer;
      determining a temporary product of said temporary sum and said first random integer;
      determining a representation of said temporary product modulo said second random integer; and
      determining said successive remainder as a sum of said previous remainder and said representation; and
  obtain said ECSM product using said new set of parameters to split said scalar.

6. The mobile communication device of claim 5 wherein said scalar is a private cryptographic key.

7. The mobile communication device of claim 5 wherein said processor is further configured to publish said ECSM product.

8. The mobile communication device of claim 5 wherein said processor is further configured to determine said successive quotient by:
  determining a temporary quotient as a sum of said previous quotient and said second random integer;
  determining a temporary product of said temporary quotient and said first random integer;
  determining an integer part of a new quotient for which said temporary product is a dividend and said second random integer is a divisor; and
  determining said successive quotient as a difference between said integer part of said new quotient and said first random integer.

9. A computer-readable medium containing computer-executable instructions that, when executed on a processor, cause said processor to obtain an Elliptic Curve Scalar Multiplication (ECSM) product of a scalar and a base point on an elliptic curve in a manner that counters power analysis attacks, said instructions, in particular, causing said processor to:

receive said base point, said scalar and a previous set of parameters used to split said scalar for a previous ECSM, said previous set of parameters including a previous quotient and a previous remainder determined using said scalar as a dividend and a first random integer as a divisor;

select a second random integer;

determine a new set of key-splitting parameters for splitting said scalar, said determining based on said previous set of parameters and said second random integer, said new set of parameters including a successive quotient and a successive remainder, said determining said new set of parameters including:
  determining said successive quotient based on said previous quotient, said previous remainder and said second random integer; and
  determining said successive remainder based on said previous quotient, said previous remainder and said second random integer, said determining said successive remainder including:
    determining a temporary sum of said previous quotient and said second random integer;
    determining a temporary product of said temporary sum and said first random integer;
    determining a representation of said temporary product modulo said second random integer; and
    determining said successive remainder as a sum of said previous remainder and said representation; and obtain said ECSM product using said new set of parameters to split said scalar.

10. The computer-readable medium of claim 9 wherein said scalar is a private cryptographic key.

11. The computer-readable medium of claim 9 wherein said instructions further cause said processor to publish said ECSM product.

12. The computer-readable medium of claim 9 wherein said instructions further cause said processor to determine said successive quotient by:
  determining a temporary quotient as a sum of said previous quotient and said second random integer;
  determining a temporary product of said temporary quotient and said first random integer;
  determining an integer part of a new quotient for which said temporary product is a dividend and said second random integer is a divisor; and
  determining said successive quotient as a difference between said integer part of said new quotient and said first random integer

* * * * *